(12) United States Patent
Al-Hejri et al.

(10) Patent No.: US 12,432,549 B2
(45) Date of Patent: Sep. 30, 2025

(54) SYSTEM AND METHOD FOR SECURE DATA TRANSMISSION BETWEEN MULTIPLE INTERNET OF THINGS ENTITIES

(71) Applicant: KING FAHD UNIVERSITY OF PETROLEUM AND MINERALS, Dhahran (SA)

(72) Inventors: Ibraheem Mohammed Ahmed Al-Hejri, Dhahran (SA); Farag Ahmed Azzedin, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 77 days.

(21) Appl. No.: 18/584,466

(22) Filed: Feb. 22, 2024

(65) Prior Publication Data
US 2025/0274752 A1    Aug. 28, 2025

(51) Int. Cl.
*H04W 12/033*    (2021.01)
*H04W 12/041*    (2021.01)
*H04W 12/0431*    (2021.01)

(52) U.S. Cl.
CPC ....... *H04W 12/033* (2021.01); *H04W 12/041* (2021.01); *H04W 12/0431* (2021.01)

(58) Field of Classification Search
CPC ........... H04W 12/033; H04W 12/0431; H04W 12/041
See application file for complete search history.

(56) References Cited

U.S. PATENT DOCUMENTS 12,158,955 B1 * 12/2024 Morse ................... G06F 21/602
2005/0226416 A1 * 10/2005 Jung ................... H04L 63/0428
380/228

(Continued)

FOREIGN PATENT DOCUMENTS

| CN | 112804685 A | 5/2021 |
| CN | 114650110 A | 6/2022 |
| CN | 114928835 A | 8/2022 |

OTHER PUBLICATIONS

Jalasri et al. ; Managing data security in fog computing in IoT devices using noise framework encryption with power probabilistic clustering algorithm ; Cluster Computing 26 ; May 17, 2022 ; 14 Pages.

(Continued)

*Primary Examiner* — Stephen T Gundry
(74) *Attorney, Agent, or Firm* — Oblon, McClelland, Maier &Neustadt, L.L.P.

(57) ABSTRACT

A secure data transmission system between multiple IOT entities includes a base station with a first program instruction in a first processing unit, and multiple clusters. Each cluster includes a cluster head having a second program instruction in a second processing unit. The cluster head is communicatively connected to the base station. Each cluster further includes multiple cluster members. Each member has a third program instruction in a third processing unit and is communicatively connected to the cluster head with a single-hop connection and is configured to sense multiple data entities. First, second and third program instructions include, a first, a second and a third data transmission protocol respectively, for data transmission, between the base station and the cluster head, between the cluster head and each cluster member and between the base station and (Continued)

the cluster head, and between the cluster member and the cluster head of the cluster, respectively.

14 Claims, 5 Drawing Sheets

(56) References Cited

U.S. PATENT DOCUMENTS

| | | | | |
|---|---|---|---|---|
| 2011/0268274 | A1* | 11/2011 | Qiu | H04L 9/0844 |
| | | | | 380/270 |
| 2016/0065362 | A1* | 3/2016 | Choyi | H04L 63/065 |
| | | | | 380/279 |
| 2020/0213823 | A1* | 7/2020 | Elkhail | H04W 4/80 |
| 2021/0336797 | A1* | 10/2021 | Van Duren | H04L 9/3297 |
| 2023/0029523 | A1* | 2/2023 | Cunha | H04L 9/3247 |
| 2023/0269580 | A1* | 8/2023 | Palanigounder | H04L 65/1073 |
| | | | | 380/270 |
| 2024/0276177 | A1* | 8/2024 | Hanuska | H04L 63/08 |
| 2024/0305467 | A1* | 9/2024 | Stewart | H04L 9/3239 |
| 2024/0322996 | A1* | 9/2024 | Kumar | H04L 63/0853 |
| 2024/0323034 | A1* | 9/2024 | Kumar | H04L 9/3268 |
| 2024/0333532 | A1* | 10/2024 | Parikh | G06F 21/6245 |
| 2024/0348592 | A1* | 10/2024 | Fraser Brown | H04L 63/101 |
| 2024/0380575 | A1* | 11/2024 | Movva | H04L 9/0825 |
| 2024/0380610 | A1* | 11/2024 | Andre | H04L 63/0823 |
| 2024/0396726 | A1* | 11/2024 | Rindal | H04L 9/0618 |
| 2024/0396735 | A1* | 11/2024 | Mukherjee | H04L 9/3221 |
| 2025/0023714 | A1* | 1/2025 | Kumar | H04L 9/0819 |
| 2025/0080359 | A1* | 3/2025 | Garg | H04L 9/14 |
| 2025/0086292 | A1* | 3/2025 | Biswas | G06F 21/606 |
| 2025/0088353 | A1* | 3/2025 | Burns | H04L 63/08 |

OTHER PUBLICATIONS

Harbi et al. ; Secure Data Transmission Scheme Based on Elliptic Curve Cryptography for Internet of Things ; Modelling and Implementation of Complex Systems ; 2018 ; 13 Pages.

Wu et al. ; A privacy-preserving and provable user authentication scheme for wireless sensor networks based on Internet of Things security ; J Ambient Intell Human Comput 8 ; Feb. 8, 2016 ; 16 Pages.

Kumari e tal. ; A secure authentication scheme based on elliptic curve cryptography for IoT and cloud servers ; J Supercomput 74 ; Apr. 11, 2017 ; 26 Pages.

Kalra et al. ; Secure authentication scheme for IoT and cloud servers ; Pervasive and Mobile Computing 24 ; Aug. 11, 2015 ; 14 Pages.

* cited by examiner

SYSTEM AND METHOD FOR SECURE DATA TRANSMISSION BETWEEN MULTIPLE INTERNET OF THINGS ENTITIES

BACKGROUND

Technical Field

The present disclosure is directed to a method and system for secure data transmission in an IoT environment. More particularly, the present disclosure relates to a system and method for secure data transmission between multiple Internet of Things entities.

Description of Related Art

The current trend in Internet of Things (IoT) security is moving towards providing lightweight and efficient schemes to secure data transmission. Ensuring the security of IoT applications has proven to be a challenge due to the incapability of a considerable proportion of resource-limited IoT devices to implement proper security schemes. Even though plenty of security defenses and countermeasures have been developed since the early stages of the internet era, these solutions cannot be applied directly to IoT infrastructure due to the significant differences in computation and storage capabilities between conventional computing and IoT devices.

To secure data transmission, techniques involving the exchange of encryption and decryption keys between two entities based on mutual agreement have been quite common in the art. For example, the Elliptic Curve Menezes-Qu-Vanstone (ECMQV) is a key agreement protocol based on elliptic curve cryptography (ECC) and includes an implicit signature authentication function. FIG. 1 illustrates an ECMQV key agreement protocol 100 between two entities known in the art. Each entity, i.e., Alice 102 and Bob 104 in the ECMQV protocol, has both a static and an ephemeral private/public key pair. A shared key is then generated from the ephemeral and static keys, ensuring that each time the protocol is executed, the two entities generate a unique common key.

Data in transit is more vulnerable to cyber attacks than in other stages of the data lifecycle. In many cases, data is transmitted between IoT devices in plaintext, especially sensitive data in enterprise information systems. Consequently, data must be protected from unauthorized access and other threats that may jeopardize the transmitted data. Another challenge in safeguarding data transmission is the diversity of communication channels and the various communication protocols and techniques that may potentially hinder the implementation of security solutions.

Various schemes have been proposed to secure data transmission in IoT environments. For example, a lightweight scheme called a secure data transmission scheme (SDTS) to secure transmitted data in Wireless Sensor Networks (WSNs) was introduced. (See: Harbi, Y.; Aliouat, Z.; Harous, S.; Bentaleb, A. "Secure data transmission scheme based on elliptic curve cryptography for internet of things". In Proceedings of the International Symposium on Modelling and Implementation of Complex Systems. Springer, 2018, pp. 34-46). The proposed scheme consists of four phases: initialization, key generation, encryption, and decryption. However, the technique is susceptible to Man-In-The-Middle (MITM) attacks, and it does not achieve integrity and authentication properties between the cluster head and cluster member.

An authentication scheme based on ECC and hash functions was proposed for WSN-based IoT systems (SEE: Wu, F.; Xu, L.; Kumari, S.; Li, X. "A privacy-preserving and provable user authentication scheme for wireless sensor networks based on internet of things security". Journal of Ambient Intelligence and Humanized Computing 2017, 8, 101-116). However, the computational and communication costs of the scheme are high, rendering it inefficient for IoT environments.

Another authentication scheme based on ECC and HTTP cookies was introduced to ensure the confidentiality of transmitted data between embedded devices and cloud servers (See: Kalra, S.; Sood, S. K. "Secure authentication scheme for IoT and cloud servers". Pervasive and Mobile Computing 2015, 24, 210-223). However, the technique falls short in achieving mutual authentication and anonymity security properties, and it is vulnerable to various attacks, including insider attacks and offline password guessing attacks.

A secure authentication scheme was proposed for cloud servers and IoT environments. (See: Kumari, S.; Karuppiah, M.; Das, A. K.; Li, X.; Wu, F.; Kumar, N. "A secure authentication scheme based on elliptic curve cryptography for IoT and cloud servers". The Journal of Supercomputing 2018, 74, 6428-6453.14). However, a major limitation of the scheme is that it does not ensure data integrity.

A new approach was proposed to create a data transmission and sinkhole detection model (See: Babaeer, H. A.; Al-Ahmadi, S. A. "Efficient and secure data transmission and sinkhole detection in a multi-clustering wireless sensor network based on homomorphic encryption and watermarking". IEEE Access 2020, 8, 92098-92109). However, the model appeared to be ineffective for detecting sinkhole attacks in certain situations.

Another scheme was proposed based on the Paillier encryption algorithm and a hash function for securing data transmission for WSNs. (See: Li, L.; Li, S.; Peng, H.; Bi, J. "An efficient secure data transmission and node authentication scheme for wireless sensing networks". Journal of Systems Architecture 2022, 133, 102760). The scheme applies deep learning techniques to accomplish efficient data sampling and compression. Then, Paillier encryption and the hash function are used to achieve data confidentiality and integrity. The scheme requires further improvement to address spatiotemporal redundancy in order to enhance the scheme's energy efficiency. However, each of the aforementioned techniques suffer from one or more drawbacks hindering their adoption.

Hence, there is a need of such system or method that could provide a reliable technique of data transmission between entities in IoT environment, involves less computational and communication costs and achieves confidentiality, integrity, and authentication, thereby overcoming limitations encountered in prior art studies.

SUMMARY

In an exemplary embodiment, a secure data transmission system between one or more Internet of Things entities is disclosed. The secure data transmission system comprises a base station having a first processing unit. The first processing unit includes a first program instruction. The secure data transmission system further comprises a plurality of clusters. Each cluster of the plurality of clusters further comprises a cluster head having a second processing unit. The cluster head is communicatively connected to the base station. The second processing unit includes a second program instruction. Each cluster of the plurality of clusters further comprises a plurality of cluster members. Each cluster members of the plurality of cluster members having a third processing unit. Each cluster members of the plurality of cluster members is communicatively connected to the cluster head of the cluster with a single-hop connection and is configured to sense one or more data entities. The third processing unit includes a third program instruction. The first program instruction includes a first data transmission protocol for data transmission between the base station and the cluster head of each cluster of the plurality of clusters. The second program instruction includes a second data transmission protocol for data transmission between the cluster head and each cluster member of the plurality of cluster members in each cluster and for data transmission between the base station and the cluster head. The third program instruction includes a third data transmission protocol for data transmission between the cluster member and the cluster head of the cluster.

In another exemplary embodiment, a method of secure data transmission between one or more Internet of Things entities is disclosed. The method includes, in a processing unit of an IoT network architecture, initiating an initializing phase for the IoT network architecture. The method further includes commencing a key establishment phase. The key establishment phase further comprising a first key establishment phase and a second key establishment phase for the IoT network architecture. The method further includes launching a data transmission phase for the IoT network architecture. The IoT network architecture comprises a base station having a first processing unit. The first processing unit includes a first program instruction. The IoT network architecture further comprises a plurality of clusters. Each cluster of the plurality of clusters further comprises a cluster head having a second processing unit. The cluster head is communicatively connected to the base station. The second processing unit includes a second program instruction. Each cluster of the plurality of clusters further comprises a plurality of cluster members. Each cluster members of the plurality of cluster members having a third processing unit. Each cluster members of the plurality of cluster members is communicatively connected to the cluster head of the cluster with a single-hop connection and is configured to sense one or more data entities. The third processing unit includes a third program instruction. The first program instruction includes a first data transmission protocol for data transmission between the base station and the cluster head of each cluster of the plurality of clusters. The second program instruction includes a second data transmission protocol for data transmission between the cluster head and each cluster member of the plurality of cluster members in each cluster and for data transmission between the base station and the cluster head. The third program instruction includes a third data transmission protocol for data transmission between the cluster member and the cluster head of the cluster.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
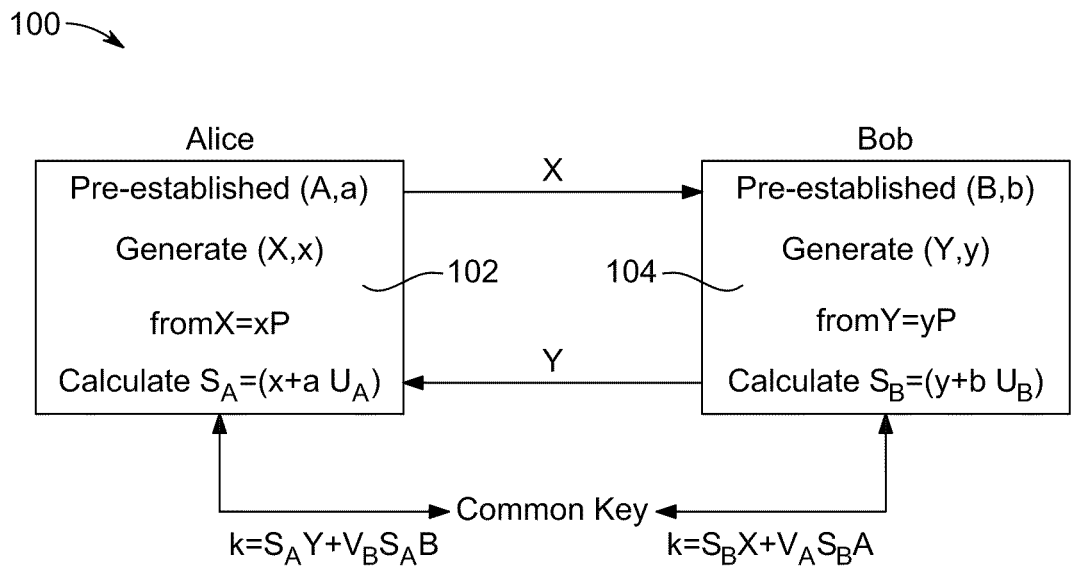
FIG. 1 illustrates an ECMQV key agreement protocol between two entities known in the art.

In the drawings, like reference numerals designate identical or corresponding parts throughout the several views. Further, as used herein, the words "a", "an" and the like generally carry a meaning of "one or more", unless stated otherwise. Furthermore, the terms "approximately," "approximate", "about" and similar terms generally refer to ranges that include the identified value within a margin of 20%, 10%, or preferably 5%, and any values therebetween.

Aspects of this disclosure are directed to a system and method for a secure data transmission system between multiple IoT entities. Exemplary IoT entities may include, but not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., as well as any device that is equipped with an addressable communications interface for communicating with the IoT network. IoT entities may also include cell phones, desktop computers, laptop computers, tablet computers, personal digital assistants (PDAs), printers, automobiles, surveillance systems, etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.). The secure data transmission system is configured to combine both symmetric and asymmetric protocols into one scheme that enhances the performance and the security of data transmission between the IoT entities and reduces the network's energy cost. The secure data transmission system is configured to use symmetric key-based protocol to ensure authentication between a base station and plurality of cluster heads. Use of the symmetric key-based protocol ensures less consumption of energy. Also, although, the communication cost is high in large networks while using symmetric key-based protocol, the overall communication cost is minimized since the number of cluster heads are comparatively less than the number of cluster members. Moreover, the processing time is minimal in symmetric key protocols since performing any complex computations is avoided. This relieves cluster heads which are already overloaded with other tasks such as gathering data from plurality of cluster members and forwarding it to the base station. Further, the secure data transmission system is configured to use Elliptic Curve Menezes-Qu-Vanstone (ECMQV) based asymmetric key protocol to enhance authentication between plurality of cluster heads and cluster members. Use of asymmetric key protocol between cluster heads and cluster members ensures requirement of only one-hope communication between the cluster members and the base station since ECMQV protocol is appropriate for large number of sensors having communication requirement of only one hope communication. Use of the asymmetric key-based protocol further ensures small amount of communication messages, thereby improving the power consumption efficiency of the communication techniques. Also, each cluster members are capable to perform ECMQV computation operations since the ECMQV is lightweight. The details of the communication techniques are elaborated in detail in FIG. 2.

Figure 2:
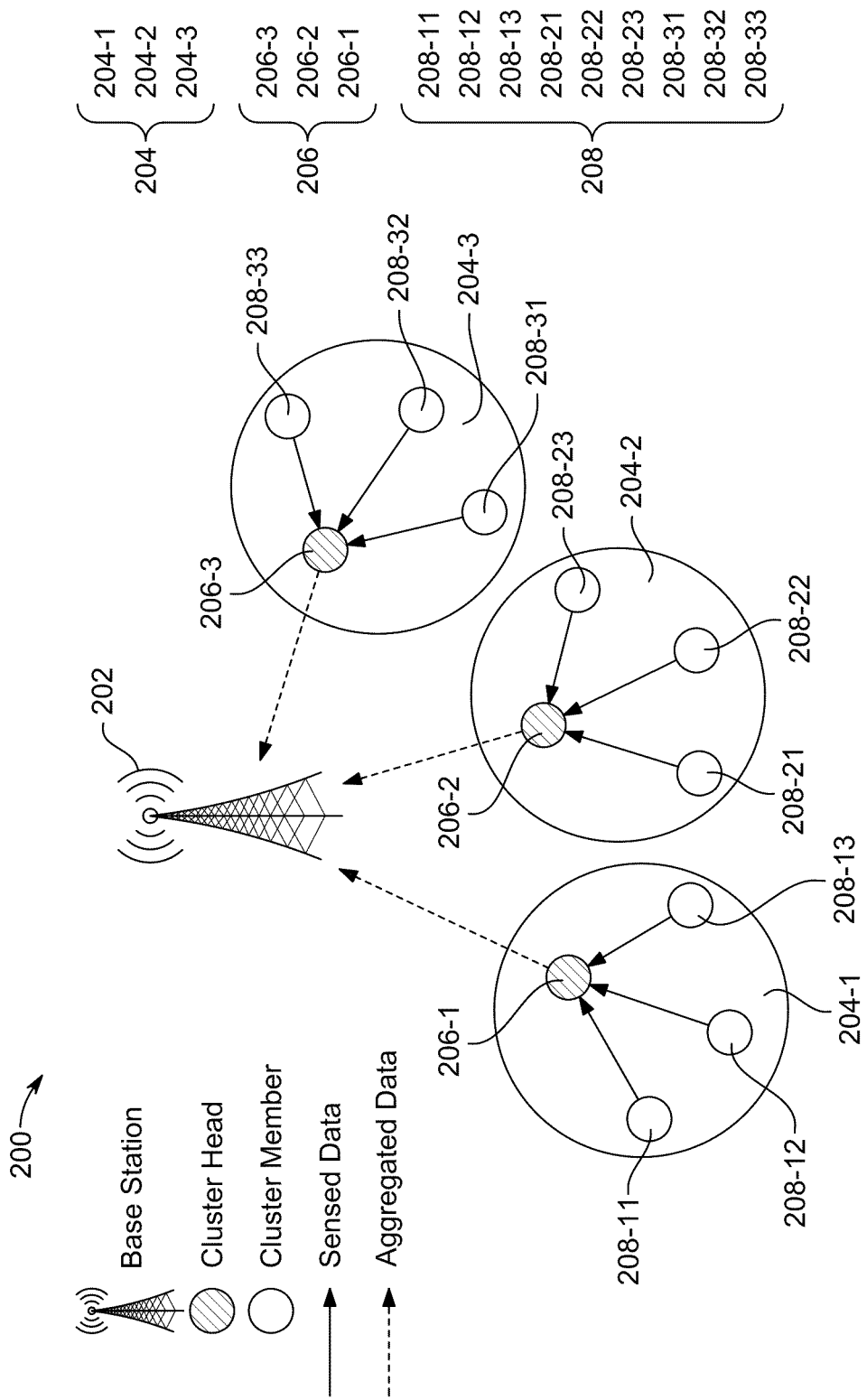
FIG. 2 illustrates a secure data transmission system, according to certain embodiments.

FIG. 2 illustrates a secure data transmission system 200, according to an embodiment. The secure data transmission system 200 includes one or more IoT entities such as a network of plurality of IoT entities. The secure data transmission system 200 is configured to provide a secure data transmission between one or more IoT entities. The secure data transmission system 200 includes a base station 202. The base station may refer to a central hub, a central server, a cloud server, or a base station of a mobile tower. In an embodiment, the base station 202 may also refer to a laptop, a desktop, a mobile or cellphone or any computing or processing system known in the art capable to perform algorithmic computations in terms of encryption and/or decryption related to authentication key. The base station 202 is assumed to be reliable, secure, and powerful computing device. The base station has a first processing unit. The first processing unit 302-1 includes a first program instruction. The first processing unit and the first program instructions are discussed in detail in FIG. 5.

The secure data transmission system 200 further includes plurality of sensors 208, referred to as plurality of IoT entities. In an embodiment, sensors 208 are homogeneous sensors or homogeneous IoT entities and are referred to as wireless sensor networks (WSN) or simply a sensor 208. The sensors 208 are grouped into clusters 204 in order to reduce the total power consumption of the secure data transmission system 200. For example, the secure data transmission system 200 includes plurality of clusters 204 such as a first cluster 204-1, a second cluster 204-2 and a third cluster 204-3. Each cluster 204 includes a cluster head 206, such as a first cluster head 206-1, a second cluster head 206-2 and a third cluster head 206-3. Each cluster head 206 is communicatively connected to the base station 202. For example, the first cluster head 206-1, the second cluster head 206-2 and the third cluster head 206-3 are communicatively connected to the base station 202. Also, each cluster head 206 has a second processing unit 306-1. The second processing unit 306-1 includes a second program instruction. The second processing unit 306-1 and the second program instructions are discussed in detail in FIG. 5.

Each sensor 208 in the cluster 204 is referred to as a cluster member 208, i.e. 208-11, 208-12, 208-13, 208-21, 208-22, 208-23, 208-31, 208-32, and 208-33. Each cluster member (i.e. 208-11, 208-12, 208-13 . . . ) of the plurality of cluster members 208 is communicatively connected to the cluster head 206 of the cluster 204 with a single-hop connection. For example, cluster members 208-11, 208-12, 208-13 in cluster 204-1 are communicatively connected to the first cluster head 206-1. Similarly, communication connectivity exists for other cluster members 208 with their respective cluster heads 206 in that respective cluster 204. Cluster members 208 in each cluster 204 are configured to gather sensed data entities and transmit it to the cluster head 206 using the single-hope communication. Each cluster head 206 is configured to gather the sensed data collected by each cluster member 208 in that respective cluster 204 and forward it to the base station 202. For example, the first cluster head 206-1 is configured to gather sensed data from cluster member 208-11, 208-12 and 208-13 and forward to the base station 202. The same is applicable for other cluster heads 206 and cluster members 208 in that respective cluster 204. In an embodiment, the total number of cluster members 208 are considered as nine, however, the number of cluster members may be more or less than nine. Each cluster member 208 has a third processing unit 308-1. The third processing unit 308-1 includes a third program instruction. The third processing unit 302-1 and the third program instructions are discussed in detail in FIG. 5.

In an embodiment, the connectivity between the cluster member 208 and the cluster head 206, between the cluster head 206 and the base station 202 and between the cluster member 208 and the base station 202 may be wired or wireless. In another embodiment, the wireless connectivity may include any communication technique considered alone or in combination of, for example, Bluetooth, Wi-Fi, Li-Fi, edge, radio-based communication, microwave-based communication, short or long wave communication, edge or GPRS based communication, 1G, 2G, 3G, 4G, 5G, 6G, 7G, 8G, 9G, 10G based communication, etc. However, the communication technique between the cluster members 208, cluster head 206 and the base station 202 is not restrictive to the mentioned communication techniques only and any other communication technique known in the current art other than described one may be used.

Figure 3:
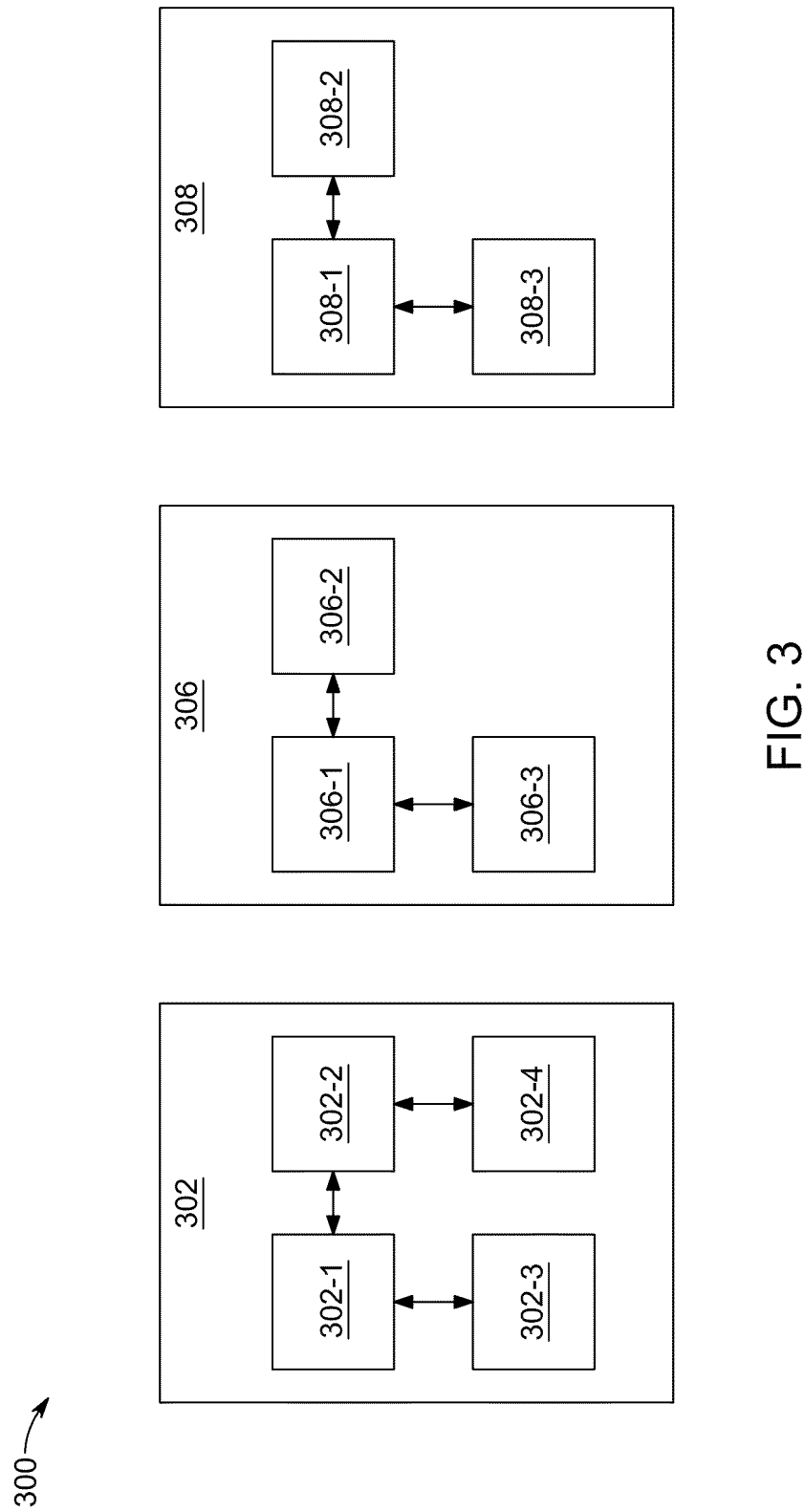
FIG. 3 illustrates a hardware description of each of the base station, the cluster head and the cluster member, according to certain embodiments.

FIG. 3 illustrates a hardware description 300 of each of the base station 302, the cluster head 306 and the cluster member 308, according to an embodiment. The base station 302, the cluster head 306 and the cluster member 308, are representative of the base station 202, the cluster head 206 and the cluster member 208, respectively, as shown in FIG. 2.

The base station 302 includes the first processing unit 302-1, a memory 302-2, a ram 302-3 and a database 302-4. The first processing unit 302-1 is communicatively connected to the memory 302-2 and the ram 302-3. The memory 302-2 is communicatively connected to the database 302-4. The first program instruction is stored in the memory 302-2. The first processing unit 302-1 is configured to fetch the first program instruction stored in the memory 302-2 at the time of execution. The first program instruction includes a first data transmission protocol for data transmission between the base station 202 and the cluster head 206 of each cluster 204 (in FIG. 2). The first data transmission protocol may be selected from a symmetric cryptography, an asymmetric cryptography, and a combination thereof. Further, the asymmetric cryptography may be an Elliptic Curve Menezes-Qu-Vanstone protocol. Additionally, the hardware structure of the base station 302 may include more or less number of components.

The cluster head 306 includes the second processing unit 306-1, a memory 306-2 and a ram 306-3. The second processing unit 306-1 is also communicatively connected to the memory 306-2 and the ram 306-3. The second program instruction is stored in the memory 306-2. The second processing unit 306-1 is configured to fetch the second program instruction at the time of execution. The second program instruction includes a second data transmission protocol for data transmission between the cluster head 206 and each cluster member 208 of the plurality of cluster members in each cluster 204 and for data transmission between the base station 202 and the cluster head 206 (in FIG. 2). The second data transmission protocol may also be selected from a symmetric cryptography, an asymmetric cryptography, and a combination thereof.

Further, the asymmetric cryptography may again be an Elliptic Curve Menezes-Qu-Vanstone protocol. Additionally, the hardware structure of the cluster head 306 may also include more or less components.

Each cluster member 308 includes the third processing unit 308-1, a memory 308-2 and a ram 303-3. The third processing unit 308-1 is also communicatively connected to the memory 308-2 and the ram 308-3. The third program instruction is stored in the memory 308-2. The third processing unit 308-1 is configured to fetch the third program instruction at the time of execution. The third program instruction includes a third data transmission protocol for data transmission between the cluster member 208 and the cluster head 206 of the cluster 204 (in FIG. 2). The third data transmission protocol may be selected from a symmetric cryptography, an asymmetric cryptography, and a combination thereof. Further, the asymmetric cryptography may again be an Elliptic Curve Menezes-Qu-Vanstone protocol. Additionally, the hardware structure of the cluster member 308 may also include more or less number of components.

Figure 4:
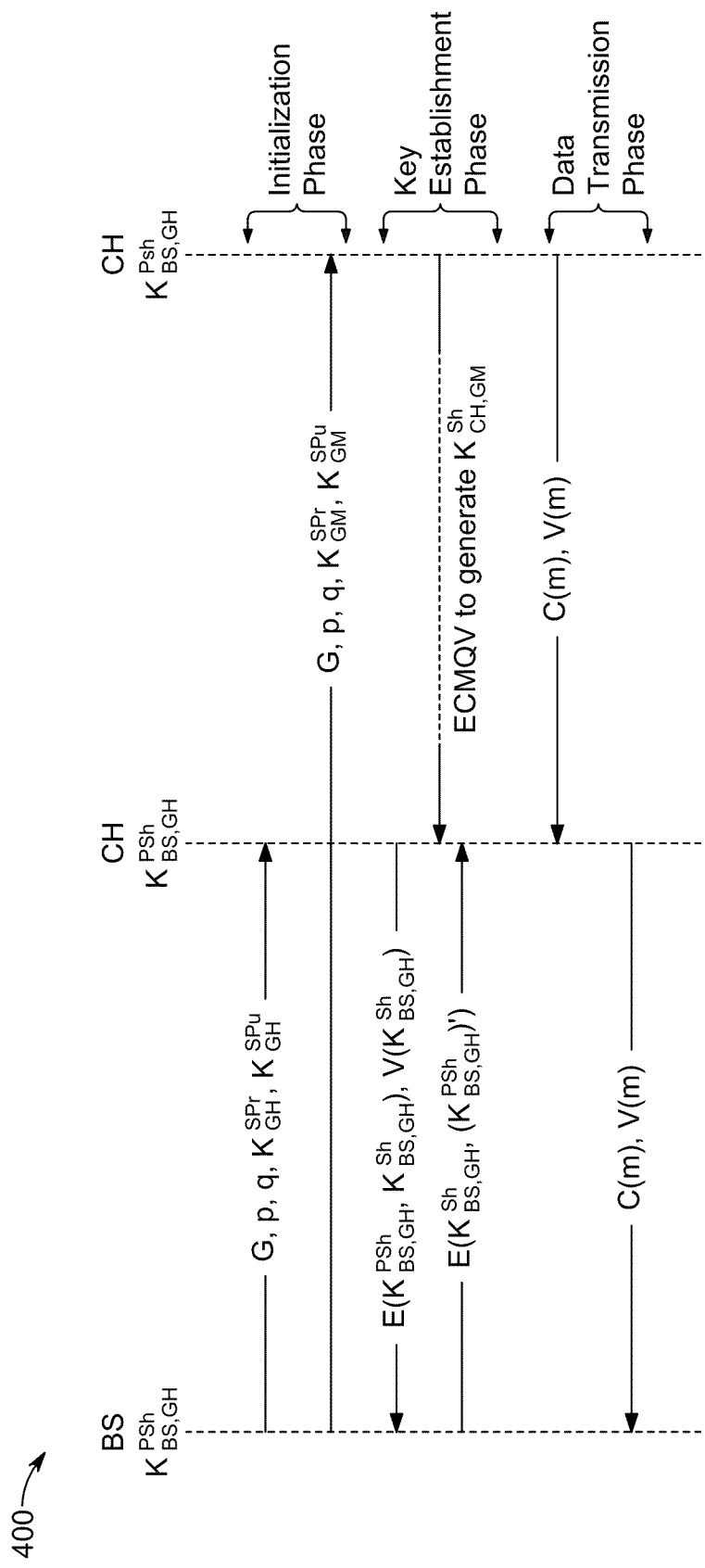
FIG. 4 illustrates a schematic diagram of the secure data transmission system for providing secure communication between one or more IoT entities, according to certain embodiments.

FIG. 4 illustrates a schematic diagram of the secure data transmission system 400 for providing secure communication between one or more IoT entities, according to an embodiment. The secure data transmission system 400 is accompanied with FIGS. 2 and 3. Also, the secure data transmission system 400 is representative of the secure data transmission system 200 in FIG. 2. The secure data transmission system 400 includes an initialization phase, a key establishment phase, such as a first key establishment phase and a second key establishment phase, and a data transmission phase in each of the data transmission protocol. Each phase is described as below:

(1) Initialization Phase

During initialization phase, a pre-shared key is securely established between the plurality of cluster members 208 and the cluster head 206 in each cluster 204. The pre-shared key is $K_{BS,CH}^{PSh}$. In addition, the base station 202 fetches the first program instruction stored in the memory 302-2 including the first data transmission protocol for data transmission between the base station 202 and the cluster head 206 to generate scheme parameters including the elliptic curve E over Fp and a base point G of prime order q. Once the scheme parameters are generated the base station 202 publishes the scheme parameters to each cluster head 206 and cluster member 208 in each cluster 204. The base station 202 further publishes the static private and public keys for both cluster members 208 and cluster heads 206 in each cluster 204. The public key either static or ephemeral is calculated from a corresponding private key based on the scheme parameters using below equation:

$$K^{SPu} = K^{SPr} * G$$

Each cluster member 208 fetches the third program instruction stored in the memory 308-2 including the third data transmission protocol for data transmission between cluster member 208 and the cluster head 206. Similarly, each cluster head 206 fetches the second program instruction stored in the memory 306-2 including the second data transmission protocol for data transmission between cluster head 206 and the cluster member 208. As such, each cluster member 208 and its cluster head 206 using the third and the second program instructions, respectively, exchange their static public keys in each cluster 204. This enables to generate the shared key between the cluster head 206 and cluster member 208 in each cluster 204 using ECMQV protocol during the next phase i.e. key establishment phase. Also, the initialization phase is only done once for generating and setting the scheme parameters.

(2) (i) Key establishment phase between cluster member 208 and cluster head 206.

This phase comprises establishment of a first key. During the first key establishment phase, each cluster member 208 in each cluster 204 fetches the third program instruction stored in the memory 308-2 including the third data transmission protocol for data transmission between the cluster member 208 and the cluster head 206 to generates an ephemeral private key $K^{EPr}$. Also, each cluster head 206 in each cluster 204 fetches the second program instruction stored in the memory 306-2 including the second data transmission protocol for data transmission between the cluster head 206 and the cluster member 208 to generates an ephemeral private key $K_{CH}$. Upon generation of ephemeral private key $K^{EPr}$ and ephemeral private key $K_{CH}$, each cluster member 208 in each cluster 204 calculates ephemeral public key based upon the generated ephemeral private key by the cluster member 208 in that cluster 204. Similarly, each cluster head 206 in each cluster 204 calculates ephemeral public key based upon the generated ephemeral private key by the cluster head 206 in that cluster 204. Once ephemeral public key is generated by each cluster member 208 and each cluster head 206 in each cluster 204, the ephemeral public key of each cluster member 208 in each cluster 204 is exchanged with ephemeral public key of each cluster head 206 in the corresponding cluster 204. Further, each cluster member 208 in each cluster 204 generates an implicit signature sa in order to compute a first shared key $K_{CM,CH}^{Sh}$ using below algorithm:

---

Algorithm 1 ECMQV Key Derivation for CM

Input: ECC parameters: E, p, G, q. Private keys: $K_{CM}^{SPr}$, $K_{CM}^{EPr}$.
Public keys: $K_{CH}^{SPu}$, $K_{CH}^{EPu}$
Output: A shared secret key $K_{CM,CH}^{Sh} \in E(F_p)$ 1: $m \leftarrow \lceil \frac{(\log 2\ q)}{2} \rceil$   ▷ [m is the half bit length of q]

2: $u_A \leftarrow (u_x \mod 2^m) + 2^m$   ▷ [$u_x$ is the x-coordinate of $K_{CM}^{EPu}$]

3: $s_A \leftarrow (K_{CM}^{EPr} + u_A \cdot K_{CM}^{SPr}) \mod q$   ▷ [Implicit Signature]

4: $v_A \leftarrow (v_x \mod 2^m) + 2^m$   ▷ [$v_x$ is the x-coordinate of $K_{CH}^{EPu}$]

5: $z_A \leftarrow s_A \cdot v_B \mod q$
6: $K_{CM,CH}^{Sh} \leftarrow MPM(s_A \cdot K_{CH}^{EPu} + z_A \cdot K_{CH}^{SPu})$

---

Similarly, each cluster head 206 in each cluster 204 generates an implicit signature $s_B$ in order to compute $K_{CM,CH}^{Sh}$ once using algorithm 1# as below:

---

Algorithm 1# ECMQV Key Derivation for CH

Input: ECC parameters: E, p, G, q. Private keys: $K_{CH}^{SPr}$, $K_{CH}^{EPr}$.
Public keys: $K_{CM}^{SPu}$, $K_{CM}^{EPu}$
Output: A shared secret key $K_{CM,CH}^{Sh} \in E(F_p)$ 1: $m \leftarrow \lceil \frac{(\log 2\ q)}{2} \rceil$   ▷ [m is the half bit length of q]

2: $u_A \leftarrow (u_x \mod 2^m) + 2^m$   ▷ [$u_x$ is the x-coordinate of $K_{CH}^{EPu}$]

Algorithm 1# ECMQV Key Derivation for CH

3:  $s_A \leftarrow (K_{CH}^{EPr} + u_A \cdot K_{CH}^{SPr})$ mod q  ▷ [Implicit Signature]
4:  $v_A \leftarrow (v_x \mod 2^m) + 2^m$  ▷ [$v_x$ is the x-coordinate of $K_{CM}^{EPu}$]
5:  $z_A \leftarrow s_A \cdot v_B$ mod q
6:  $K_{CM,CH}^{Sh} \leftarrow MPM(s_A \cdot K_{CM}^{EPu} + z_A \cdot K_{CM}^{SPu})$ However, the algorithm 1 # is slightly different for cluster head 206 compared to algorithm 1 for cluster member 208. Here, in the algorithm 1 # for cluster head 206, all terms ($K^{SPr}_{CM}$, $K^{EPr}_{CM}$, $K^{SPu}_{CH}$, $K^{EPu}_{CM}$, $K^{EPu}_{CH}$) replaces with ($K^{SPr}_{CH}$, $K^{EPr}_{CH}$, $K^{SPu}_{CM}$, $K^{EPu}_{CH}$, $K^{EPu}_{CM}$) in the algorithm 1 for cluster member 208.

Further, each cluster member 208 in each cluster 204 is configured to perform multiple point multiplication (MPM) operation using Shamir's method to compute a first shared key. For example, the processing unit 308-1 is configured to fetch algorithm 2 stored in the memory 308-2 of the cluster member 208 in each cluster 204. The stored algorithm in memory 308-2 of the cluster member 208 is shown below:

Algorithm 2 Multiple Point Multiplication (MPM)

Input: The points P, Q ∈ $E(F_p)$, two positive m-bit integers (scalars): k = $\Sigma_{i=0}^{m-1} 2^i k_i$, l = $\Sigma_{i=0}^{m-1} 2^i l_i$ where $k_i, l_i \in (0, 1)$ and $$P = \frac{K^{EPu}}{CH}, Q = \frac{K^{SPu}}{CH}, k = s_A, l = z_A$$

Output: R = k · P + l · Q ∈ $E(F_p)$
1:   Z ← P + Q         ▷ [Pre-computation Stage]
2:   R ← O
3:   for i ← m − 1 to 0 do
4:     R ← R + R       ▷ [Point Doubling]
5:     if ($k_i$ = 1) and ($l_i$ = 0) then
6:       R ← R + P
7:     end if
8:     if ($k_i$ = 0) and ($l_i$ = 1) then
9:       R ← R + Q
10:    end if
11:    if ($k_i$ = 1) and ($l_i$ = 1) then
12:      R ← R + Z
13:    end if
14:  end for
15:  return R In summary, the algorithm 2 executes the elliptic scalar multiplications operations concurrently, especially with the pre-computed stage (Step 1 in Algorithm 2). The identical bits of k and l are scanned from most significant to least significant bit. The intermediate value (Step 2 in Algorithm 2), which is initially set to infinity, is doubled for each bit as shown in step 4 in Algorithm 2. If the locations of the scanned bit are ($k_i$=1, $l_i$=0), ($k_i$=0, $l_i$=1), or ($k_i$=1, $l_i$=1) then, P, Q, or P+Q is added to the intermediate value, respectively as shown in steps 5-13 in Algorithm 2.

Similarly, each cluster head 206 in each cluster 204 is configured to perform multiple point multiplication (MPM) operation using Shamir's method to compute a first shared key. For example, the processing unit 306-1 is configured to fetch algorithm 2 # stored in the memory 306-2 of the cluster head 206 in each cluster 204. The stored algorithm 2 # in the memory 306-2 of the cluster head 206 is shown below:

Algorithm 2# Multiple Point Multiplication (MPM)

Input: The points P, Q ∈ $E(F_p)$, two positive m-bit integers (scalars): k = $\Sigma_{i=0}^{m-1} 2^i k_i$, l = $\Sigma_{i=0}^{m-1} 2^i l_i$ where $k_i, l_i \in (0, 1)$ and $$P = \frac{K^{EPu}}{CH}, Q = \frac{K^{SPu}}{CH}, k = s_A, l = z_A$$

Output: R = k · P + l · Q ∈ $E(F_p)$
1:   Z ← P + Q         ▷ [Pre-computation Stage]
2:   R ← O
3:   for i ← m − 1 to 0 do
4:     R ← R + R       ▷ [Point Doubling]
5:     if ($k_i$ = 1) and ($l_i$ = 0) then
6:       R ← R + P
7:     end if
8:     if ($k_i$ = 0) and ($l_i$ = 1) then
9:       R ← R + Q
10:    end if
11:    if ($k_i$ = 1) and ($l_i$ = 1) then
12:      R ← R + Z
13:    end if
14:  end for
15:  return R In summary, the algorithm 2 # executes the elliptic scalar multiplications operations concurrently, especially with the pre-computed stage (Step 1 in Algorithm 2 #). The identical bits of k and l are scanned from most significant to least significant bit. The intermediate value (Step 2 in Algorithm 2 #), which is initially set to infinity, is doubled for each bit as shown in step 4 in Algorithm 2. If the locations of the scanned bit are ($k_i$=1, $l_i$=0), ($k_i$=0, $l_i$=1), or ($k_i$=1, l; =1) then, P, Q, or P+Q is added to the intermediate value, respectively as shown in steps 5-13 in Algorithm 2.

(2) (ii) Key Establishment Phase Between the Base Station 202 and the Cluster Head 206.

This phase comprises establishment of a second key. During the second key establishment phase, each cluster head 206 fetches the second program instruction stored in the memory 306-2 including the second data transmission protocol to generates $K_{BS,CH}^{Sh}$ i.e. a second shared key between the cluster head 206 and the base station 202 by each cluster member 208 in each cluster 204. Further, each cluster head 206 encrypts $K_{BS,CH}^{Sh}$ i.e. the second shared key, using the pre-shared key $K_{BS,CH}^{PSh}$ that was established securely between the base station 202 and the cluster head 206 in each cluster 204 during the initialization phase and thus generates an encrypted second shared key $CK_{BS,CH}^{Sh}$ for each cluster head 206 in each cluster 204. Further, each cluster head 206 calculates a hash value $V(K_{BS,CH}^{Sh})$ of the encrypted second shared key $CK_{BS,CH}^{Sh}$ with $K_{BS,CH}^{PSh}$ using 256 hash functions. Further, each cluster head 206 in each cluster 204 sends the encrypted second shared key $CK_{BS,CH}^{Sh}$ and the first hash function $V(K_{BS,CH}^{Sh})$ to the base station 202. Further, each cluster head 206 deletes the stored pre-shared key $K_{PSh}^{BS,CH}$ in each cluster 204 and generates a new pre-shared key for the next round of the protocol to enhance the security communication. In an embodiment, the pre-shared key is considered as a nonce that acts as a resistant against replay attacks.

When the base station 202 receives the data transmitted from each cluster head 206, the base station 202 fetches the first program instruction stored in the memory 302-2 including the first data transmission protocol for data transmission between the base station 202 and the cluster head 206 to compute a second hash function ($V(K_{BS,CH}^{Sh})$) based on the encrypted second shared key $CK_{BS,CH}^{Sh}$ for each cluster head 206 in each cluster 204. Further, the base station 202 compares the first hash function ($V(K_{BS,CH}^{Sh})$) received from each cluster head 206 and the second hash function ($V(K_{BS,CH}^{Sh})$) computed for each cluster 204 to verify a first authenticity. If the base station 202 does not find a match between the two, it rejects the message. On the other side, if match is found i.e. authenticated, the base station 202 decrypts the encrypted second shared key $CK_{BS,CH}^{Sh}$ using $K_{BS,CH}^{Sh}$ to get the second shared key $V(K_{BS,CH}^{Sh})$. The base station 202 further stores the second shared key $V(K_{BS,CH}^{Sh})$ the database 302-4 as shared key between the base station 202 and the cluster head 206. As such, the second shared key $V(K_{BS,CH}^{Sh})$ is identical to the decrypted second shared key $CK_{BS,CH}^{Sh}$. Performing the plurality of steps guarantees establishing a shared key securely where only cluster head 206 the base station 202 have access to the second shared key $K_{BS,CH}^{Sh}$, since it is encrypted with the pre-shared key which is known only to cluster head 206 and the base station 202. Also, the cluster head 206 gets authenticated to the base station 202 as the matching between the recalculated and received hashes is held if they are only done with the same pre-shared key $K_{BS,CH}^{Sh}$ which is known only to the cluster head 206 in that cluster 204 and the base station 202.

Further, to authenticate the base station 202 to the cluster head 206, the base station 202 generates a new pre-shared key ($K_{BS,CH}^{PSh}$) based on the shared key by the base station 202 to replace the pre-shared key stored in the base station 202. The new pre-shared key ($K_{BS,CH}^{PSh}$) is to be used for the next round of authentication. Further, the base station 202 encrypts the new pre-shared key ($K_{BS,CH}^{PSh}$) using the second shared key $K_{BS,CH}^{Sh}$. Doing this, the base station 202 obtains an encrypted new pre-shared key which is known only to the base station 202 and the cluster head 206. Further, the base station 202 sends the encrypted new pre-shared key ($K_{BS,CH}^{PSh}$) to each cluster head 206. Therefore, ($K_{BS,CH}^{PSh}$) can be accessed only by the cluster head 206. The key establishment phase between the base station 202 and the cluster head 206 is shown in algorithm 3 as below:

---

Algorithm 3 Key Establishment Between BS and CH

---

Input: $K_{BS,CH}^{PSh}$

Output: $K_{BS,CH}^{Sh}$ received by BS

1: for each CH do
2:     Generate $K_{BS,CH}^{Sh}$
3:     Compute $CK_{BS,CH}^{Sh} = E(K_{BS,CH}^{PSh}, K_{BS,CH}^{Sh})$     ▷ [Encrypt $K_{BS,CH}^{Sh}$ using $K_{BS,CH}^{PSh}$]
4:     Compute $V(K_{BS,CH}^{Sh}) = MAC(K_{BS,CH}^{PSh}, CK_{BS,CH}^{Sh})$
5:     Send ($CK_{BS,CH}^{Sh}$, $V(K_{BS,CH}^{Sh})$) to BS
6:     Cancel $K_{BS,CH}^{PSh}$
7: end for
8: for each $CK_{BS,CH}^{Sh}$ and $V(K_{BS,CH}^{Sh})$ received| by BS do
9:     Compute $(V(K_{BS,CH}^{Sh}))' = MAC(K_{BS,CH}^{PSh}, CK_{BS,CH}^{Sh})$
10:    if $((V(K_{BS,CH}^{Sh}))' = V(K_{BS,CH}^{Sh}))$ then
11:       Compute $K_{BS,CH}^{Sh} = D(K_{BS,CH}^{PSh}, CK_{BS,CH}^{Sh})$   ▷ [Decrypt $CK_{BS,CH}^{Sh}$ using $K_{BS,CH}^{PSh}$]
12:       Keep $K_{BS,CH}^{Sh}$ in database as a shared key.
13:       Generate $(K_{BS,CH}^{Sh})'$     ▷ [A new key for the next run]
14:       Send $E(K_{BS,CH}^{Sh}, (K_{BS,CH}^{PSh})')$ to CH   ▷ [Encrypt $(K_{BS,CH}^{PSh})'$ using $K_{BS,CH}^{Sh}$]
15:    end if
16: end for (3) Data Transmission Phase During this phase, the data m sensed by any cluster member 208, using the third transmission protocol, is encrypted using the first shared key $K_{CM,CH}^{Sh}$ to obtain an encrypted one or more data entities C(m). The cluster members 208 in each cluster 204 further computes a third hash function V(m) of the encrypted one or more data entities C(m). Further, each cluster member 208 in each cluster 204 sends the encrypted data C(m) along with the third hash function V(m) to the cluster head 206 in each cluster 204.

After the cluster head 206 receives the encrypted data C(m) from cluster members 208 in each cluster 204, the cluster head 206, using the second transmission protocol, computes a fourth hash function (V(m))' of the encrypted data C(m). further, the cluster head 206 compares the received third hash function V (w) from each cluster member 208 with the computed fourth hash function (V(m)) for that cluster member 208. If both hash functions matches, the base station 202 authenticates the cluster member 208 as a second authenticity process and decrypts the encrypted data C(m) from each cluster member 208 using the first shared key $K_{CM,CH}^{Sh}$ to obtain the message 'm' from each cluster member 208. Here, when the second authentication is completed, the decrypted data entities is identical to the one or more data entities.

After gathering the data from all cluster members 208, the cluster head 206, using the second data transmission protocol, aggregates the sensed data. Further, the cluster head 206 encrypts the aggregated data using the second shared key $K_{BS,CH}^{Sh}$. Doing this, the cluster head 206 obtains an encrypted aggregated data. Further, each cluster head 206 computes a fifth hash function V(m) of the encrypted aggregated data based on the second shared key $K_{BS,CH}^{Sh}$. Further, each cluster head 206 sends the encrypted version of the sensed data C(m) along with the fifth hash function V(m) to the base station 202.

The base station 202, using the first data transmission protocol, computes a sixth hash function (V(m))' of the encrypted aggregated data C(m) based on the second shared key $K_{BS,CH}^{Sh}$. The base station 202 compares the sixth hash function (V(m))' of the encrypted aggregated data against the fifth hash function V(m) to verify a third authenticity. If no match is found, the communication messages are ignored by the base station 202. Otherwise, once the third authenticity is confirmed, the base station 202 decrypts the encrypted aggregated data C(m) for each cluster 204 using the second shared key $K_{BS,CH}^{Sh}$ to obtain a decrypted aggregated data 'm'. In this case, the decrypted aggregated data is identical to aggregated data. Further, the base station 202 saves the decrypted aggregated data m in the database 302-4. The data transmission phase is illustrated in Algorithm 4 as below:

---

Algorithm 4 Data Transmission Phase

---

Input: Sensed data m by CM, $K_{CM,CH}^{Sh}$ and $K_{BS,CH}^{Sh}$

Output: Received data m by BS

1:    for each m sensed by CM do
2:      Compute C(m) = E($K_{CM,CH}^{Sh}$, m)    ▷ [Encrypt m using $K_{CM,CH}^{Sh}$]
3:      Compute V(m) = MAC($K_{CM,CH}^{Sh}$, C(m))
4:      Send (C(m), V(m)) to CH.
5:    end for
6:    for each C(m) and V(m) received by CH do
7:      Compute (V(m))' = MAC($K_{CM,CH}^{Sh}$, C(m))
8:      if ((V(m))' = V(m)) then
9:        Compute m = D($K_{CM,CH}^{Sh}$, C(m))    ▷ [Decrypt C(m) using $K_{CM,CH}^{Sh}$]
10:       Compute C(m) = E($K_{BS,CH}^{Sh}$, m)    ▷ [Encrypt in using $K_{BS,CH}^{Sh}$]
11:       Compute V(m) = MAC($K_{BS,CH}^{Sh}$, C(m))
12:       Send (C(m), V(m)) to BS
13:      end if
14:    end for
15:    for each C(m) and V(m) received by BS do
16:      Compute (V(m))' = MAC($K_{BS,CH}^{Sh}$, C(m))
17:      if ((V(m))' = V(m)) then
18:        Compute m = D($K_{BS,CH}^{Sh}$, C(m))    ▷ [Decrypt C(m) using $K_{BS,CH}^{Sh}$]
19:      end if
20:    end for Performance Analysis.

The performance of the secure data transmission system 200, 400 is evaluated in terms of communication cost, computational cost, and security services. While analyzing the performance, 160 bits ECC, AES-128, and SHA-256 was used to achieve the appropriate level of security. First, the overall communication cost is analyzed.

(1) Communication Cost Analysis

The ECC of 160-bit is selected. For example, the hash functions, random numbers, and symmetric encryption/decryption operations are considered as of 160 bits. The communication costs for the cluster member 208, the cluster head 206 and the base station 202 for one data transmission is evaluated.

During the key establishment phase between the cluster member 208 and the cluster head 206, the cluster member 208 transmits their ephemeral public key $K_{CM}^{EPu}$ to the cluster head 206. The ephemeral public key $K_{CM}^{EPu}$ is 160 bits long to the cluster head 206. Each cluster head 206 also sends its ephemeral public $K_{CH}^{EPu}$ to the cluster member 208 which is also 160 bits long to the cluster member 208.

Further, during the key establishment phase between the cluster head 206 and the base station 202, each cluster head 206 send the encrypted shared key $CK_{BS,CH}^{Sh}$ with V ($K_{BS,CH}^{Sh}$) to the base station 202. Thus, the message size is 160+160=320 bits. The base station 202 sends the encrypted new pre-shared key $(K_{BS,CH}^{PSh})'$ which is also 160 bits long to the cluster head 206.

During the data transmission phase, each cluster member 208 send the encrypted data C(m) along with the resulting hash output V(m) to the cluster head 206. The message size is 160+160=320 bits. After gathering the data from all cluster member 208, the cluster head 206 sends the encrypted version of the received data C(m) along with V(m) to the base station 202. At this moment, the message size is 160+160=320 bits. Accordingly, the total communication cost for one data transmission is 320+480+640=1440 bits. The same is shown in Table 1 below:

TABLE 1

Overall communication cost

| Scheme Phase | Cost(bits) |
| --- | --- |
| Key Establishment (CM, CH) | 320 |
| Key Establishment (CH, BS) | 480 |
| Data Transmission | 640 |
| Total | 1440 |

(2) Computation Cost Analysis

Most studies in the art considered the ECC point multiplication $(T_m)$ and the hash function $(T_h)$ operations. According to a published paper by Xu, L. and Wu, F, titled "*Cryptanalysis and improvement of a user authentication scheme preserving uniqueness and anonymity for connected health care*", Journal of medical systems 2015, 39, 1-9, $T_m$=7.3529 ms, $T_h$=0.0004 ms. here, $T_m \gg T_h$. Therefore, ECC point multiplication (Tm) is the most expensive and critical operation for performance analysis. In the present invention, the computational costs for cluster member 208, cluster head 206 and the base station 202 is computed for one data transmission.

During the key establishment phase between the cluster member 208 and the cluster head 206, as illustrated in algorithm 1, i.e. the first key establishment phase, each cluster member 208 calculates ephemeral public key $K_{CM}^{EPu}$ which considers or utilizes one ECC point multiplication $(T_m)$ operation. Further, in algorithm 2, the cluster member 208 considers or utilizes another $(T_m)$ to calculate the shared key $K_{CM,CH}^{Sh}$. Similarly, each cluster head 206 calculates its ephemeral public key which utilizes one $T_m$ operation. Further, in algorithm 2 as discussed before, each cluster head 206 utilizes another $T_m$ to calculate the shared key $K_{CM,CH}^{Sh}$.

During the key establishment phase between the cluster head 206 and the base station 202 as illustrated in algorithm 3, i.e. the second key establishment phase, each cluster head 206 calculates $V(K_{BS,CH}^{Sh})$ which utilizes one hash function $T_h$ operation. Similarly, the base station 202 calculates $(V(K_{BS,CH}^{Sh}))$ which utilizes one hash function $T_h$ operation.

During the data transmission phase, each cluster member 208 calculates $V_m$ which utilizes one hash function $T_h$ operation. After the cluster head 206 receives the data from corresponding cluster member 208 in each cluster 204, the cluster head 206 recalculates hash function $(V(_m))'$ which utilizes one Th operation. After gathering the data from all cluster members 208, each cluster head 206 further calculates $V_m$ which utilizes another hash function Th operation. Once the data reaches the base station 202, the base station 202 recalculates $(V(_m))'$ which utilizes one $T_h$ operation. The total computation cost for one data transmission is $4T_m+6T_h$ as shown in Table 2.

TABLE 2

Overall computation cost

| Scheme Phase | CM | CH | BS | Total |
| --- | --- | --- | --- | --- |
| Key Estab. (CM, CH) | 2($T_m$) | 2($T_m$) | — | 4($T_m$) |
| Key Estab. (BS, CH) | — | 1($T_h$) | 1($T_h$) | 2($T_h$) |
| Data Transmission | 1($T_h$) | 2($T_h$) | 1($T_h$) | 4($T_h$) |
| Total | 2($T_m$) + 1($T_h$) | 2($T_m$) + 3($T_h$) | 2($T_h$) | 4($T_m$) + 6($T_h$) |

(3) Security Analysis (1) Confidentiality: The data transmission system of the current invention ensures confidentiality. The sensed data is encrypted using ECC before being sent. Accordingly, the data confidentiality is protected by the ECC encryption. If an attacker is able to crack the secret key and asymmetric pair of keys for one cluster in one round, the attacker is unable to extract benefit from those keys since new keys are generated in every round.

(2) Integrity and end-to-end mutual authentication: The data transmission system of the current invention guarantees establishing a shared key $K_{BS,CH}^{Sh}$ where only the cluster head 206 and the base station 202 have access to the shared key since it is encrypted by the pre-shared key, which is known only to the cluster head 206 and the base station 202. Moreover, each cluster head 206 is authenticated to the base station 202 as the matching between the recalculated and received hashes is kept if they are only done with the same pre-shared key $K_{BS,CH}^{PSh}$ which is known only to each cluster head 206 and the base station 202. Finally, to authenticate the base station 202 to the cluster head 206, the base station 202 generates a new pre-shared key $(K_{BS,CH}^{PSh})$ to be used for the next round of the protocol. The new pre-shared key is sent to the cluster head 206 encrypted using $K_{BS,CH}^{Sh}$ which is known only to the base station 202 and the cluster head 206. As such, the new pre-shared key can only be accessed by the cluster head 206. In addition, the data transmission system of the current invention establishes a key agreement between the cluster head 206 and the cluster member 208 using ECMQV protocol. Each entity in ECMQV has both a static and an ephemeral private/public key pair. As illustrated in algorithm 1, both the cluster head 206 and the cluster member 208 need to calculate the implicit signature in order to generate the shared Key from their static and ephemeral keys. It ensures that each time the ECMQV protocol is executed, each cluster head 206 and the respective cluster member 208 will generate a unique shared key. If a malicious party attempts to compromise the system in any way, its shared key will be different from the one that is shared between the cluster head 206 and the cluster member 208 since the private key of the malicious party is unrelated to either of the reliable public keys. Therefore, any attempt by the malicious party to compromise the system is impossible.

(3) Resistant to Man-in-the-middle (MITM) attack: Any attempt to launch a MITM attack is thwarted because the data transmission system of the current invention achieves mutual authentication between the cluster head 206 and the base station 202 and between the cluster member 208 and the cluster head 206 as described throughout the invention.

(4) Resistant to replay attack: During the key establishment phase between the cluster head 206 and the base station 202, the messages transmitted in the data transmission system of the current invention include a random number which is the pre-shared key $K_{BS,CH}^{PSh}$ that disables any attempt to carry out a replay attack. If an attacker attempts to replay any message without changing the pre-shared key, the replayed message is detected immediately. As such, the attacker cannot calculate the shared key to crack the session.

(5) Resistant to brute force attack: The data transmission system of the current invention uses 160 bits ECC and AES-128 to achieve the appropriate level of security. As such, a fruitful brute force attack has a very little chance of succeeding. Furthermore, the keys generated in each run are utilized to encrypt/decrypt data only for one round. As a result, the compromise of one round's keys has no impact on the system's security.

(4) Comparative Analysis:

The performance of the data transmission system of the current invention is compared with another method known in the prior art, titled "*Secure data transmission scheme based on elliptic curve cryptography for internet of things*", by Harbi, Y.; Aliouat, Z.; Harous, S.; Bentaleb, In Proceedings of the International Symposium on Modelling and Implementation of Complex Systems. Springer, 2018, pp. 34-46. Table 3 shows the comparison of the communication cost between the data transmission system of the current invention and the referred prior art. It was observed that during the key generation phase, the data transmission system of the current invention has the same communication cost on the cluster head 206, while it has small increased communication costs on the cluster member 208 and the base station 202 as compared to the referred prior art. The additional cost provides data integrity and mutual authentication which are not achieved in the prior art. It was also noticed that the data transmission system of the current invention has less communication cost than the referred prior art during the data transmission phase which is executed more often comparing with other phases. As such, it can be noted that the data transmission system of the current invention is better than the method presented in the referred prior art, in terms of communication cost.

TABLE 3 comparison of the communication cost

| Scheme | Key Gen. | | | Data Trans. | | | Total | | |
| --- | --- | --- | --- | --- | --- | --- | --- | --- | --- |
| | CM | CH | BS | CM | CH | BS | CM | CH | BS |
| Prior art-1 | — | 480 | — | 480 | 800 | — | 480 | 1280 | — |
| Current invention | 1.60 | 480 | 160 | 320 | 320 | — | 480 | 800 | 160 |

Also, the comparison of the computation cost between the data transmission system of the current invention and the referred prior art is shown in Table 4. It was analyzed that during the key generation phase, the data transmission system of the current invention has less computation cost on the base station 202 than the referred prior art, while it has little increased computation costs on the cluster members 208 and the cluster head 206. The main reason being the data transmission system of the current invention provides the data integrity and mutual authentication, while the method presented in the referred prior art does not provide the data integrity and mutual authentication. In addition, it was observed that the data transmission system of the current invention has less computation cost than the referred prior art during the data transmission phase which is carried out more frequently than other phases. As such, it is noticed that the data transmission system of the current invention is better than the method presented in the referred prior art, in terms of computation cost.

TABLE 4

Computation Cost Comparison

| | Key Gen. | | | Data Trans. | | | Total | | |
|---|---|---|---|---|---|---|---|---|---|
| Scheme | CM | CH | BS | CM | CH | BS | CM | CH | BS |
| Prior art -1 | — | $2T_m$ | $1T_m$ | $1T_m$ | $1T_h$ | $1T_m + 1T_h$ | $1T_m$ | $2T_m + 1T_h$ | $2T_m + 1T_h$ |
| Current invention | $2T_m$ | $2T_m + 1T_h$ | $1T_h$ | $1T_h$ | $2T_h$ | $1T_h$ | $2T_m + 1T_h$ | $2T_m + 3T_h$ | $2T_h$ |

Table 5 shows the comparison of security features and performance of our scheme with the referred prior art as well as some other known prior arts. The other known prior arts are as following: 2-Wu, F.; Xu, L.; Kumari, S.; Li, X. "*A privacy-preserving and provable user authentication scheme for wireless sensor networks based on internet of things security*". Journal of Ambient Intelligence and Humanized Computing 2017, 8, 101-116; 3-Kumari, S.; Karuppiah, M.; Das, A. K.; Li, X.; Wu, F.; Kumar, N. "*A secure authentication scheme based on elliptic curve cryptography for IoT and cloud servers*". The Journal of Supercomputing 2018, 74, 6428-6453; and 4-Kalra, S.; Sood, S. K. "*Secure authentication scheme for IoT and cloud servers*". Pervasive and Mobile Computing 2015, 24, 210-223.

Based on experimental data presented in table 5, it is observed that the data transmission system of the current invention incorporates the necessary IoT security proprieties, and it is resistant to different attacks. On the other hand, it was also observed that other methods in the prior art (i.e., 1-4) known in the art are vulnerable to one or more of these attacks. In addition, other methods in the prior art (i.e., 1-4 do not achieve some of the IoT security proprieties such as data integrity and mutual authentication. The results of comparison show that the data transmission system of the current invention is secure, lightweight, and efficient when compared to other related methods known in the art. Therefore, the data transmission system of the current invention is appropriate to be used in IoT environments with limited resources.

TABLE 5

Comparison of lightweight method for securing data in transit

| Property | Current invention | [1] | [2] | [3] | [4] |
|---|---|---|---|---|---|
| Confidentiality | ✓ | ✓ | ✓ | ✓ | ✓ |
| Integrity | ✓ | X | ✓ | X | X |
| Mutual Authentication | ✓ | X | ✓ | ✓ | X |
| MITM Attack Resistance | ✓ | X | ✓ | ✓ | ✓ |
| Brute Force Attack Resistance | ✓ | ✓ | X | ✓ | ✓ |
| Replay Attack Resistance | ✓ | ✓ | X | ✓ | ✓ |
| Communication Cost (bits) | 1440 | 1760 | 5760 | 2400 | 2240 |
| Computational Cost | $4T_m + 6T_h$ | $5T_m + 2T_h$ | $4T_m + 56T_h$ | $10T_m + 12T_h$ | $9T_m + 10T_h$ |

Figure 5:
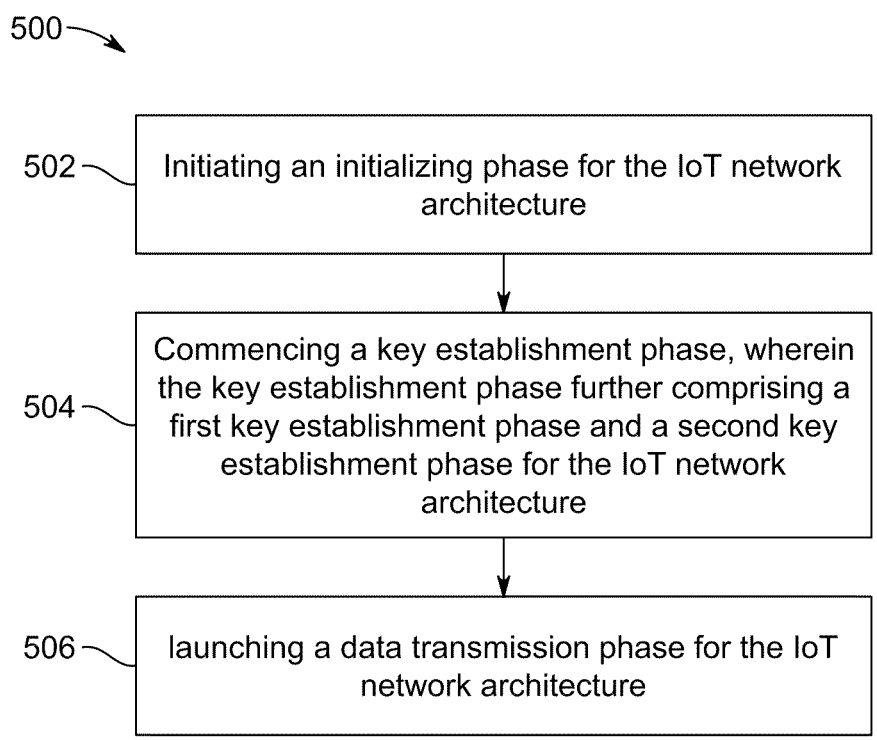
FIG. 5 illustrates a flowchart of a method for secure data transmission system between one or more Internet of Things entities, according to certain embodiments.

FIG. 5 illustrates a flowchart of a method 500 for IoT network architecture 200 and secure data transmission system 400 between one or more Internet of Things entities. The method is performed in processing units 206-1, 206-2 and 206-3 of an IoT network architecture 200 utilizing the phase scheme of secure data transmission system 400. The method 500 is described in conjunction with FIGS. 2-4. Various steps of the method 500 are included through blocks in FIG. 5. One or more blocks may be combined or eliminated to achieve control method 500 for secure data transmission system 200, 400 between one or more Internet of Things entities, without departing from the scope of the present disclosure.

At step 502, the method 500 includes, in a processing unit 206-1, 206-2, 206-3 of an IoT network architecture 200, initiating an initializing phase for the secure data transmission system 400.

At step 504, the method 500 includes commencing a key establishment phase. The key establishment phase further comprising a first key establishment phase and a second key establishment phase for the secure data transmission system 400.

At step 506, the method 500 includes launching a data transmission phase for the secure data transmission system 400.

The above-described hardware description is a non-limiting example of corresponding structure for performing the functionality described herein.

Numerous modifications and variations of the present disclosure are possible in light of the above teachings. For example, method of the secure data transmission system used in the current invention could be expanded to include heterogeneous wireless sensors networks (WSNs) with plurality of base stations. It is therefore to be understood that within the scope of the appended claims, the invention may be practiced otherwise than as specifically described herein.

The invention claimed is:

1. A secure data transmission system between Internet of Things entities, the secure data transmission system comprising:
 a base station having a first processor coupled to a first memory, wherein the first processor includes a first program instruction; and
 a plurality of clusters, each cluster of the plurality of clusters further comprising:
 a cluster head having a second processor coupled to a second memory, wherein the cluster head is communicatively connected to the base station, wherein the second processor includes a second program instruction; and
 a plurality of cluster members each cluster members of the plurality of cluster members having a third processor coupled to a third memory, wherein each cluster members of the plurality of cluster members is communicatively connected to the cluster head of the cluster with a single-hop connection and is configured to sense one or more data entities, wherein the third processor includes a third program instruction;
 wherein the first program instruction includes a first data transmission protocol for data transmission between the base station and the cluster head of each cluster of the plurality of clusters;
 wherein the second program instruction includes a second data transmission protocol for data transmission between the cluster head and each cluster member of the plurality of cluster members in each cluster and for data transmission between the base station and the cluster head;
 wherein the third program instruction includes a third data transmission protocol for data transmission between the cluster member and the cluster head of the cluster;
 wherein the first, second, and third data transmission protocol are selected from a symmetric cryptography, an asymmetric cryptography, and a combination thereof;
 wherein the asymmetric cryptography is an Elliptic Curve Menezes-Qu-Vanstone protocol; and
 wherein each data transmission protocol comprises:
 an initialization phase;
 a key establishment phase, wherein the key establishment phase further comprising a first key establishment phase and a second key establishment phase; and
 a data transmission phase.

2. The secure data transmission system of claim 1, wherein the initialization phase comprises:
 establishing a pre-shared key between the plurality of cluster members and the cluster head in each cluster;
 generating scheme parameters, a private key, and a public key for each cluster head and plurality of cluster members, wherein the public key is calculated from a corresponding private key based on the scheme parameters;
 publishing the private key and the public key to each cluster heads and plurality of cluster members; and
 exchanging the public key between the plurality of cluster members and the cluster head in each cluster;
 wherein the private key and the public key is static or ephemeral;
 wherein the scheme parameters include an elliptic curve and a base point of a prime order.

3. The secure data transmission system of claim 2, wherein the first key establishment phase further comprises:
 generating a cluster member (CM) ephemeral private key by each plurality of cluster members and a cluster head (CH) ephemeral private key by each cluster head in each cluster;
 calculating a CM ephemeral public key based on the CM ephemeral private key by each plurality of cluster members and a CH ephemeral public key based on the CH ephemeral private key by each cluster head in each cluster;
 exchanging the CM ephemeral public key and CH ephemeral public key between the plurality of cluster members and the cluster head in each cluster;
 generating a CM signature by each plurality of cluster members and a CH signature by each cluster head in each cluster; and
 computing a first shared key based on a multiple point multiplication operation.

4. The secure data transmission system of claim 3, wherein the multiple point multiplication operation includes a Shamir's method.

5. The secure data transmission system of claim 3, wherein the second key establishment phase further comprises:
 generating a second shared key between the cluster head and the base station by each cluster head;
 encrypting the second shared key by each cluster head based on the pre-shared key to generate an encrypted second shared key for each cluster head;
 computing a first hash function of the encrypted second shared key by each cluster head;
 sending the encrypted second shared key and the first hash function to the base station from each cluster head;
 deleting the pre-shared key stored in each cluster head;
 computing a second hash function based on the encrypted second shared key for each cluster head by the base station;
 comparing the first hash function received from each cluster head and the second hash function for each cluster to verify a first authenticity;
 decrypting the encrypted second shared key based on the first authenticity;
 obtaining and saving a decrypted second shared key in a database based on the pre-shared key stored in the base station, wherein the second shared key is identical to the decrypted second shared key;
 generating a new pre-shared key based on the shared key by the base station to replace the pre-shared key stored in the base station;
 encrypting the new pre-shared key based on the shared key to obtain an encrypted new pre-shared key by the base station; and sending the encrypted new pre-shared key to each cluster head.

6. The secure data transmission system of claim 5, wherein the data transmission phase comprises:
encrypting the one or more data entities based on the first shared key by each plurality of cluster members to obtain an encrypted one or more data entities;
computing a third hash function of the encrypted one or more data entities by each plurality of cluster members;
sending the encrypted one or more data entities and the third hash function to the cluster head from each plurality of cluster members in each cluster;
computing a fourth hash function of the encrypted one or more data entities based on the first shared key by the cluster head in each cluster;
comparing the third hash function received from each plurality of cluster members and the fourth hash function for each cluster to verify a second authenticity;
decrypting the encrypted one or more data entities for each plurality of cluster members based on the second authenticity to obtain a decrypted one or more data entities, wherein the decrypted one or more data entities is identical to the one or more data entities;
gathering the one or more data entities for each plurality of cluster members to obtain an aggregated data;
encrypting the aggregated data based on the second shared key to obtain an encrypted aggregated data by each cluster head;
computing a fifth hash function of the encrypted aggregated data based on the second shared key by each cluster head;
sending the encrypted aggregated data and the fifth hash function to the base station from each cluster head;
computing a sixth hash function of the encrypted aggregated data based on the second shared key by the base station;
comparing the fifth hash function received from each cluster head and the sixth hash function for each cluster to verify a third authenticity;
decrypting the encrypted aggregated data for each cluster based on the third authenticity to obtain a decrypted aggregated data, wherein the decrypted aggregated data is identical to aggregated data; and
saving the aggregated data in the base station.

7. A method of secure data transmission between one or more Internet of Things entities, the method comprising:
in a processing unit of an Internet of Things (IoT) network architecture:
initiating an initializing phase for the IoT network architecture;
commencing a key establishment phase, wherein the key establishment phase further comprising a first key establishment phase and a second key establishment phase for the IoT network architecture; and
launching a data transmission phase for the IoT network architecture;
wherein the IoT network architecture comprises:
a base station having a first processing unit, wherein the first processing unit includes a first program instruction; and
a plurality of clusters, each cluster of the plurality of clusters further comprising:
a cluster head having a second processing unit, wherein the cluster head is communicatively connected to the base station, wherein the second processing unit includes a second program instruction; and
a plurality of cluster members each cluster members of the plurality of cluster members having a third processing unit, each cluster members of the plurality of cluster members wherein is communicatively connected to the cluster head of the cluster with a single-hop connection and is configured to sense one or more data entities, wherein the third processing unit includes a third program instruction;
wherein the first program instruction includes a first data transmission protocol for data transmission between the base station and the cluster head of each cluster of the plurality of clusters;
wherein the second program instruction includes a second data transmission protocol for data transmission between the cluster head and each cluster member of the plurality of cluster members in each cluster and for data transmission between the base station and the cluster head;
wherein the third program instruction includes a third data transmission protocol for data transmission between the cluster member and the cluster head of the cluster.

8. The method of claim 7, wherein the first, second, and third data transmission protocol are selected from a symmetric cryptography, an asymmetric cryptography, and a combination thereof.

9. The method of claim 8, wherein the asymmetric cryptography is an Elliptic Curve Menezes-Qu-Vanstone protocol.

10. The method of claim 9, wherein the initialization phase comprises:
establishing a pre-shared key between the plurality of cluster members and the cluster head in each cluster;
generating scheme parameters, a private key, and a public key for each cluster head and plurality of cluster members, wherein the public key is calculated from a corresponding private key based on the scheme parameters;
publishing the private key and the public key to each cluster heads and plurality of cluster members; and
exchanging the public key between the plurality of cluster members and the cluster head in each cluster;
wherein the private key and the public key is static or ephemeral;
wherein the scheme parameters include an elliptic curve and a base point of a prime order.

11. The method of claim 10, wherein the first key establishment phase further comprises:
generating a CM ephemeral private key by each plurality of cluster members and a CH ephemeral private key by each cluster head in each cluster;
calculating a CM ephemeral public key based on the CM ephemeral private key by each plurality of cluster members and a CH ephemeral public key based on the CH ephemeral private key by each cluster head in each cluster;
exchanging the CM ephemeral public key and CH ephemeral public key between the plurality of cluster members and the cluster head in each cluster;
generating a CM signature by each plurality of cluster members and a CH signature by each cluster head in each cluster; and
computing a first shared key based on a multiple point multiplication operation.

12. The method of claim 11, wherein the multiple point multiplication operation includes a Shamir's method.

13. The method of claim 11, wherein the second key establishment phase further comprises:
  generating a second shared key between the cluster head and the base station by each cluster head;
  encrypting the second shared key by each cluster head based on the pre-shared key to generate an encrypted second shared key for each cluster head;
  computing a first hash function of the encrypted second shared key by each cluster head;
  sending the encrypted second shared key and the first hash function to the base station from each cluster head;
  deleting the pre-shared key stored in each cluster head;
  computing a second hash function based on the encrypted second shared key for each cluster head by the base station;
  comparing the first hash function received from each cluster head and the second hash function for each cluster to verify a first authenticity;
  decrypting the encrypted second shared key based on the first authenticity;
  obtaining and saving a decrypted second shared key in a database based on the pre-shared key stored in the base station, wherein the second shared key is identical to the decrypted second shared key;
  generating a new pre-shared key based on the shared key by the base station to replace the pre-shared key stored in the base station;
  encrypting the new pre-shared key based on the shared key to obtain an encrypted new pre-shared key by the base station; and
  sending the encrypted new pre-shared key to each cluster head.

14. The method of claim 13, wherein the data transmission phase comprises:
  encrypting the one or more data entities based on the first shared key by each plurality of cluster members to obtain an encrypted one or more data entities;
  computing a third hash function of the encrypted one or more data entities by each plurality of cluster members;
  sending the encrypted one or more data entities and the third hash function to the cluster head from each plurality of cluster members in each cluster;
  computing a fourth hash function of the encrypted one or more data entities based on the first shared key by the cluster head in each cluster;
  comparing the third hash function received from each plurality of cluster members and the fourth hash function for each cluster to verify a second authenticity;
  decrypting the encrypted one or more data entities for each plurality of cluster members based on the second authenticity to obtain a decrypted one or more data entities, wherein the decrypted one or more data entities is identical to the one or more data entities;
  gathering the one or more data entities for each plurality of cluster members to obtain an aggregated data;
  encrypting the aggregated data based on the second shared key to obtain an encrypted aggregated data by each cluster head;
  computing a fifth hash function of the encrypted aggregated data based on the second shared key by each cluster head;
  sending the encrypted aggregated data and the fifth hash function to the base station from each cluster head;
  computing a sixth hash function of the encrypted aggregated data based on the second shared key by the base station;
  comparing the fifth hash function received from each cluster head and the sixth hash function for each cluster to verify a third authenticity;
  decrypting the encrypted aggregated data for each cluster based on the third authenticity to obtain a decrypted aggregated data, wherein the decrypted aggregated data is identical to aggregated data; and
  saving the aggregated data in the base station.

* * * * *